United States Patent [19]

Krieg

[11] 4,449,052
[45] May 15, 1984

[54] METHOD OF PRINTING AND DETECTING OPTIMUM BAR CODE TEST PATTERNS

[75] Inventor: Michael L. Krieg, Lexington, Ky.

[73] Assignee: International Business Machines Corporation, Armonk, N.Y.

[21] Appl. No.: 325,894

[22] Filed: Nov. 30, 1981

[51] Int. Cl.³ .............................................. G06K 7/10
[52] U.S. Cl. .................................. 250/568; 235/462; 235/485; 382/50
[58] Field of Search ...................... 250/568, 566, 569; 235/462, 463, 485; 382/50, 41, 54, 57

[56] References Cited

U.S. PATENT DOCUMENTS

| | | | |
|---|---|---|---|
| 4,044,227 | 8/1977 | Holm et al. | 250/568 |
| 4,349,741 | 9/1982 | Bobart et al. | 250/568 |
| 4,349,742 | 9/1982 | Flurry et al. | 250/568 |

OTHER PUBLICATIONS

*IBM Technical Disclosure Bulletin*, "Bar Code Record Format" by K. L. Bobart et al., vol. 24, No. 4, Sep. 1981, pp. 1793–1795.
*IBM Technical Disclosure Bulletin*, "ETAB Bar Code" by D. W. Phillips et al., vol. 21, No. 7, Dec. 1978, pp. 2883–2884.

*Primary Examiner*—David C. Nelms
*Assistant Examiner*—J. Brophy
*Attorney, Agent, or Firm*—John A. Brady

[57] ABSTRACT

Test patterns (6) in bar code of different densities are printed at the start of document (20) preparation on the line with a alignment mark (5). The test patterns (6) are immediately read at different timing intervals (59) corresponding to the densities of the patterns. The highest density pattern (6) having test data which is recognized by the logic (61) as correctly sensed, defines the subsequent printing density to be used. First, the next line of data 3 is printed in the lowest density with a code defining the density of the subsequent printing. When a document (20) is read, the first line is read with the clock (59) intervals corresponding to the lowest density. The frequency is then changed to that defined by the code in the first line. Alternatively, the frequency is adjusted lower when an ordinary line of data is re-read and found to read incorrectly.

16 Claims, 2 Drawing Figures

METHOD OF PRINTING AND DETECTING OPTIMUM BAR CODE TEST PATTERNS

DESCRIPTION

1. Technical Field

This invention relates to methods of recording and sensing bar code at preselected densities. The bar code is an arbitrary group of lines having meaning by their width, spacing or the like when traversed by a scanner. Density refers to the closest spacing between code lines in the code as actually printed.

2.

Bar codes are commonly known in various forms and are characterized by their capability of recording information which can be recovered by a single pass along a line by a scanning device. Typically, bar codes are a series of vertical marks which carry information by their varying widths, by the varying spacing between marks, or by both.

A prior bar code system identical to the one employed with this inveniton is described in U.S. Pat. application Ser. No. 6/198,311; filed Nov. 20, 1980, U.S. Pat. No. 4,349,741 by K. L. Bobart et al and assigned to the same assignee to which this invention is assigned. That system, however, provided only for printing and reading at one code density. No prior system is known which provides for the printing of the code at different densities.

Since code density is fixed in prior systems, certain papers and other mediums which yield imprecise printing must be avoided. A major reason is the spreading of ink allowed by the paper. This is a particular problem with ink jet printers. Moreover, to provide for the use of a relatively wide range of papers or other substrates with different characteristics, a fixed density must be relatively low. Bar codes placed far enough apart permit the use of virtually any paper, but at the cost of corresponding inefficiency in the amount of data recorded per line of bar code.

DISCLOSURE OF THE INVENTION

In accordance with this invention bar code is recorded and sensed at different densities depending on the results observed from predefined test patterns printed on the paper or other substrate to be used. The test patterns are printed at different densities and then read with the scanner. A preferred density, typically the highest density from which the test data was accurately retrieved, is subsequently employed. A code is employed with each record to define the density used and timing during reading is adjusted to conform to that density.

With this system a wide range of papers and the like can be printed upon with each paper carrying data of densities at or near its maximum efficiency.

BRIEF DESCRIPTION OF THE DRAWING

The details of this invention will be described in connection with accompanying drawing, in which.

BEST MODE FOR CARRYING OUT THE INVENTION

Figure 1:
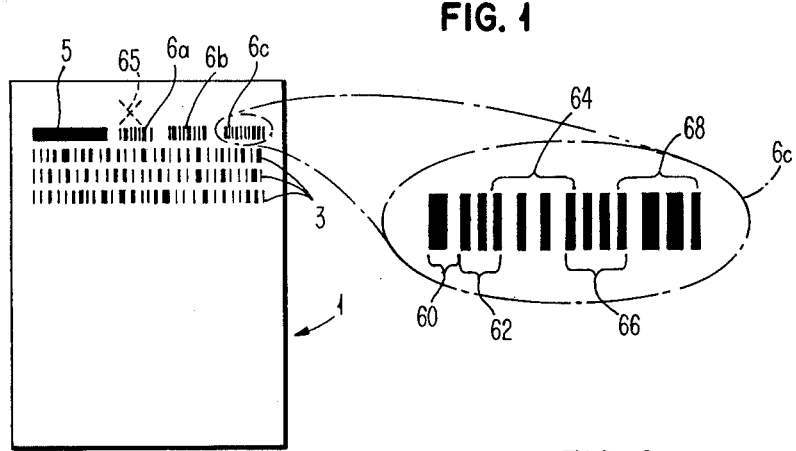
FIG. 1 shows a typical paper printed with bar code, including an alignment mark and three test patterns with an enlargement of one of the test patterns.

FIG. 1 shows a paper carrying bar code information 3 which may be in several parallel lines as shown. Above that coded information is a horizontal alignment mark 5, which is a solid rectangular mark printed along with the bar code information 3. The alignment mark is printed by the same printer which prints the bar code 3.

In accordance with this invention, spaced past alignment mark 5 on the same horizontal line with mark 5 are three test patterns 6a, 6b and 6c. Each test pattern 6 is a group of bar code of the same essential kind as that in line 3, and printed at different densities. Specifically, the density of the left pattern 6a is at a preselected low density, the density of pattern 6b is at a preselected intermediate density, and the density of test pattern 6c is at a preselected high density. The patterns 6 are separated horizontally from each other and from alignment mark 5 by unprinted or white areas of 12.5 millimeters.

Figure 2:
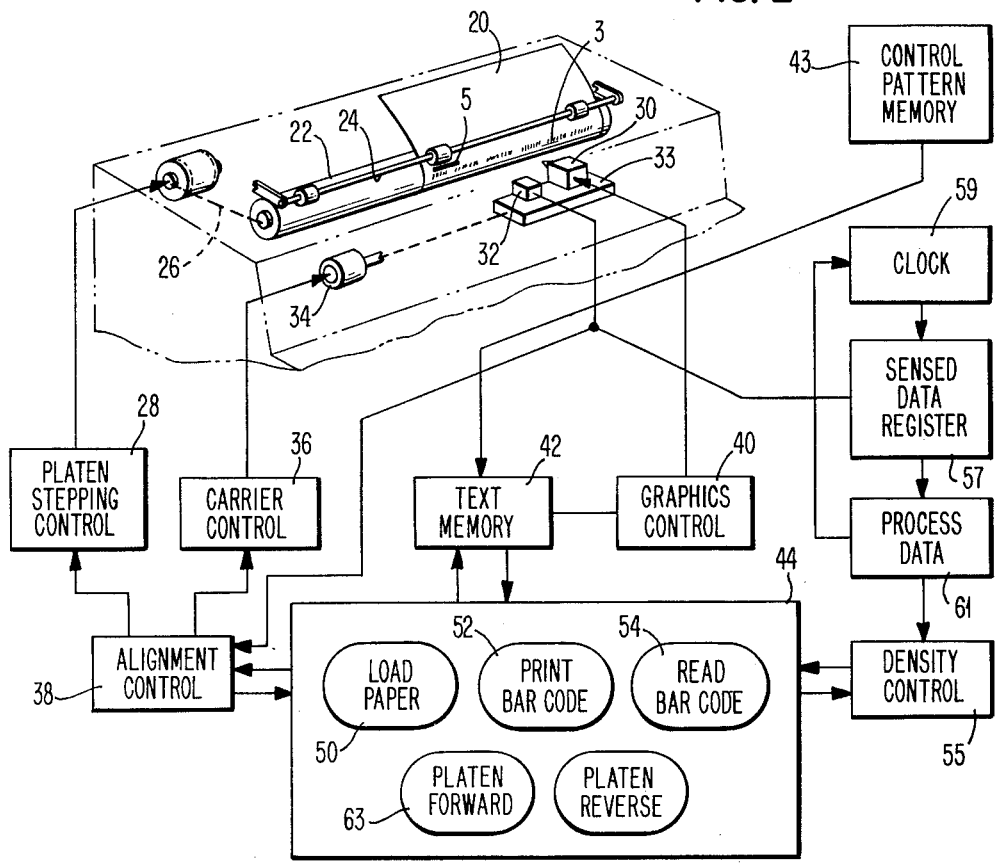
FIG. 2 is illustrative of the overall system.

FIG. 2 illustrates an operative system, which is under semi-automatic control. The printing elements and control hardware are basically conventional. A sheet of paper 20 to be printed upon, which is typically ordinary letter paper, is mounted against a platen 22, where it is held by bail 24. Paper 20 is moved longitudinally by platen drive 26, under control of platen stepping control 28.

Paper 20 is traversed horizontally by printer 30, which is preferably an ink jet printer or matrix printer, and by optical scanner 32. Printer 30 and scanner 32 are mounted on a carrier 33 and moved together by drive 34 under control of carrier control 36.

The specific designs of printer 30 and optical scanner 32 form no part of this invention. An ink jet printer of any standard design is inherently well suited to print the solid rectangle of alignment mark 5 and the vertical bars of different widths which make up a typical bar code 3. Accordingly, the print-receiving characteristics of the paper 20 being printed upon becomes more significant as edge definition of bars printed by ink jet printers varies considerably with those characteristics.

Scanner designs typically incorporate a light source and a photoconductor in an optical path by which light is trained upon and the reflections are received from a small area being observed. For most purposes, only reflections from a limited, pre-defined area are passed to the photoconductor. In the preferred embodiment this is accomplished by an opaque screen having an opening, which is 30 mils in height and 3 mils in width.

The vertical bars 3 and alignment mark 5 are each approximately 68.5 mils in height. Platen 22 is stepped in increments of 1/96 inch. Movement of carrier 33 is measured in increments of 1/240 inch, while the drive is by a DC motor and uninterrupted. Indexing of platen 22 may be uninterrupted where movement of more than one increment is directed. When the movement of both platen 22 and carrier 33 is stopped, the final position is defined by the number of increments traversed. Such incremental position systems are well known in graphics and printing systems, and their details will not be described.

In the preferred embodiment of this invention, position of the paper 20 relative to the printer 30 and optical scanner 32 is monitored by storage in memory of a start position followed by counting of increments of indexing both positively and negatively. Although separate counting circuits and hardware logic could be provided, the preferred embodiment employs a general purpose microprocessor for control and implementation of the steps involved. This element is shown symbolically in FIG. 2 as alignment control 38. The printer 30 is additionally under the control of a microprocessor, shown symbolically as graphics control 40, to define the pattern of printing applied to paper 20. Graphics control 40 may be any state-of-the-art system for printing characters and predefined special symbols such as the alignment mark.

The text to be printed in bar code typically will be the contents of magnetic or other memory, shown as text memory 42. Text memory 42 receives control pattern information from a separate memory, shown symbolically as memory 43, which in a typical system is preferably information generated as required by suitably programmed microprocessor.

Although signals representing characters and words can be generated contemporaneously with their recording in bar code as will be described, usually text is generated in a full line or page and is proof read and revised as necessary prior to being taken from memory 42 to be printed in bar code.

FIG. 2 shows illustratively the manual key operations related to printing and reading bar code. The operator control panel or keyboard 44 is shown illustratively. Loading of paper 20 on platen 22 may be manual. Where it is automatic, the operator manually operates the load paper key 50. With the paper loaded, the machine will typically go through an automatic scan across the platen 22 from left of where paper 20 could be to past the right margin of paper 20. The left and right margins of paper 20 are observed by optical scanner 32 and defined in position and stored in alignment control 38. Alternately, the paper 20 may simply be loaded at or within predefined points on platen 22 and the location of the edges of paper 20 will then be known, predetermined factors in control 38.

Paper 20 may be loaded for use in either of two modes, to print bar code 3 or to read bar code 3 from a paper which carries bar code 3 in accordance with this invention. For printing, paper 20 is typically blank, and the operator manually operates print bar code key 52. Information in text memory 42 will then be printed, along with the alignment mark 5 and the test patterns 6 as will be described below. For reading bar code, the operator manually locates scanner 32 higher than alignment mark 5 and manually operates read bar code key 54.

Printing With Density Selection

With paper 20 loaded on platen 22, operation of print bar code key 52 initiates further activity automatically with the sequence directed by alignment control 38 and density control 55. Density control 55 could be special purpose logic and timing circuits, but preferably is achieved by a suitably programmed microprocessor. (The printing routine typically will assume a certain spread from black, especially for an ink-jet-on-paper system, so the actual horizontal spacing while printing black may be considerably less than for a white intended to have the same effective width. This is an implementation detail and forms no part of this invention.)

Initially, carrier 33 is brought to the predefined left printing margin by carrier drive 34 controlled by carrier control 36. Alignment mark 5, a solid rectangular character 68.5 mils in height and 2 inches in width is printed by printer 30 and with the pattern defined by graphics control 40 as carrier 33 moves uninterrupted across the paper 20. A 12.5 millimeter blank portion is left after mark 5 is printed. Control pattern information from memory 43 is entered into text memory 42. Density control 55 dictates a printing of test pattern 6a at the lowest of three preselected densities. Carrier 33 continues to move uninterrupted across paper 20, and a 12.5 millimeter blank portion is left after pattern 6a. Density control 55 dictates a printing of test pattern 6b at a greater density. Carrier 33 still continues to move uninterrupted across paper 20, and a 12.5 millimeter blank portion is left after pattern 6b. Density control 55 dictates a printing of test pattern 6c at the highest of three preselected densities.

Each test pattern 6 has format elements dictated by the system, as well as density characteristics which are to be recognized. The basic format was developed prior to this invention.

The basic format arrangement as employed for reading in both directions and with parity error checking is described in an article entitled "Bar Code Record Format" by K. L. Bobart et al, published in September 1981 in the *IBM Technical Disclosure Bulletin* at Vol. 24, No. 4, pages 1793-1795. The preferred structure of this embodiment is designed to respond to the type of format there disclosed, and applicable elements of that format are therefore incorporated into the test pattern 6.

The first elements of the format are termed the guard pattern sub-field, denominated 60 on the enlargement of pattern 6c in FIG. 1. It is formed by one wide black bar followed by one wide white bar, and it is used to allow the bar code signal sensing system to become initialized to the level of light reflected, with sensing level first automatically shifting toward black while sensing the wide black and then moving toward an accurate level for white during the wide white. The details of such optical sensing are not essential to this invention and form no part of it.

The next elements are termed the sync pattern sub-field 62, which is a narrow black bar followed by a narrow white bar followed by a narrow black bar and finally followed by a narrow white bar. Such a regular, repetitive pattern has a very high probability of being recognized correctly. The processing system, upon recognition of the sync pattern, ignores prior extraneous marks and prepares to receive data.

The coding technique is every transition a bit (ETAB). ETAB bar code is taught in an article entitled "ETAB Bar Code" by D. W. Phillips et al published in December 1978 in the *IBM Technical Disclosure Bulletin* at Vol. 21, No. 7, pages 2883-2884. As there fully described, each transition from white to black defines the start of a bit, the end of which being defined by the next transition from white to black. Any transition from black to white also defines the start of a bit, and the end of that bit is defined by the next transition from black to white. Bits of predetermined, intermediate length are deemed to have the significance of 1, while bits of predetermined shorter or longer length are deemed to have the significance of 0.

The next elements are start test pattern code 64, comprising a unique predetermined six bit code in ETAB. A start code defines the content of the message which follows. A start test pattern code signifies that a message follows which is the predetermined test data. (The start test pattern may be followed by a single narrow bar where the system is built to note parity of the number of bits in the beginning field. Such parity is not significant for these test patterns as they are not to be read both left-to-right and right-to-left.)

The next elements are the test data 66, comprising alternating narrow black and narrow white bars defining six bits in ETAB. Since defining the accuracy of edge definition is the basic objective of the test, employing all narrow bars in the test pattern 66 provides for a test where failure would be most likely.

The next elements are an end test pattern code 68, comprising a second, unique predetermined six bit code in ETAB. An end code signifies the end of the test pattern. This code in pattern 6c will differ from those in patterns 6a and 6b to signify that the last pattern in the line of test patterns has been read.

Upon printing the alignment mark 5 and three test patterns 6 on the same line as described, the line will, without operator intervention, be read three times at internal clock rates corresponding to the three densities of the printing of the test patterns. Prior to such reading, an effective vertical position difference between printer 30 and scanner 32 will be automatically obtained and employed in the subsequent reading operation. That is fully disclosed in the foregoing referenced application Ser. No. 6/198,311. Since it forms no part of this invention and is not essential to the practice of this invention, it will not be discussed further.

During reading, carrier 33 is moved at a predetermined constant speed by carrier drive 34 across the line just printed. Conditions sensed by the optical scanner 32 are entered into sensed data register 57 at regular intervals defined by pulses from clock 59. Data from register 57 is tranferred to processing and processed by a general purpose microprocessor, shown symbolically by process data block 61. Signals from block 61 control clock 59 and are inputs to density control 55. (Typically, the system will be designed to read the condition sensed over a bar a number of times under control of the clock 59 and the width of a bar will be recognized as narrow or wide by the number of consecutive identical optical conditions sensed falling in a predetermined range. The details of this are a matter of choice and form no part of this invention.)

The timing from clock 59 is initially set at long intervals corresponding to the low density of test pattern 6a. As the entire subsequent reading and density selection operation is preferably executed and controlled by suitably programmed microprocessing elements, the subsequent operation of density selection will be described in the sequence of pertinent steps performed. Programming of a microprocessing system to execute such steps in order is a routine matter in the programming art and forms no essential part of this invention.

1. Set clock at initial rate.
2. Observe for period of white long enough to be the 12.5 millimeter space border test field.
3. If space border observed, interpret next black as start of test pattern.
4. Read test data in test pattern.
5. Compare test data with predetermined data—store yes if test data accurately read; store no if test data not accurately read.
6. If space border observed, interpret next black as start of test pattern.
7. Set clock at intermediate rate corresponding to the density of the middle test pattern.
8. Read test data in test pattern.
9. Compare test data with predetermined data—store yes if test data accurately read; store no if test data not accurately read.
10. If space border observed, interpret next black as start of test pattern.
11. Set clock at high rate corresponding to the density of the right test pattern.
12. Compare test data with predetermined data—store yes if test data accurately read; store no if test data not accurately read.
13. Recall highest density of test pattern for which yes is stored.
14. Print control information at lowest density.
15. Set printer density control to print at density represented by the recalled density. And,
16. Print at the recalled density.

It will be recognized that the system as described, comprising a carriage-mounted printer subject to the overall control and support by the logic capabilities of a microprocessor, is highly flexible. Accordingly, this invention can be implemented with many immaterial variations and enhanced by other variations particularly by repetitive scanning with merging or averaging of the logical data obtained. Preferably the line of test patterns is always scanned three times and the best results occurring at least twice are made the basis of density selection.

Making the first test pattern encountered, pattern 6a, the one of lowest density, assures that a start test pattern code and end test pattern code will be signalled to the data processing with the first data encountered. This is control information which, among various uses possible in the system logic, confirms that the machine is operating correctly in the read-test-pattern mode. Where it is convenient to set the clock to one frequency for each complete line sweep, setting the clock at the lowest frequency and then having pattern 6a at the lowest density assures an early reading of the start test pattern code.

In the preferred system as just discussed, the first line of bar code 3 under the alignment mark 5 and the test patterns 6 is always printed at the lowest density. In the prior system that first line contained various descriptive information about the data on the document, including for example the title and originator of the document. In accordance with this invention that first line also contains a designation of the density of the subsequent bar code. That will be reliably read as it is printed at the lowest density and the machine automatically reads that line with clocking correct for the lowest density.

In the system described in the foregoing referenced application Ser. No. 6/198,311 a line of bar code is automatically read immediately after it is printed to test for accuracy. If an accurate printing can not be verified after a suitable number of repeated attempts, then, in accordance with one alternative implementation of this invention the data is printed on the following line at the next lower density. The remainder of the document would be printed using the lower density. This feature does not ordinarily provide for a prior direct signal or the like which notifies the reading system of the new density. In some systems, a reader may be compatible with the lower density without change of the clocking of the reader. Alternatively, a reading system may be designed to automatically change read-timing to that of the next lower density where the set number of failure lines are encountered.

An alternative to printing the top line at lowest density employs the guard pattern. As mentioned, certain preliminary code fields appear at the start of every line. The very first is the guard pattern of a wide black bar followed by a wide white bar. These widths are not critical, and they could be varied in a code which defines the density to be subsequently used while still adequately initializing the optical sensor, their original function. As still another alternative, a code employing all relatively wide bars, to which the machine responds at all read-timing conditions, could be the first code encountered after the sync pattern, which code specifies the density of subsequent printing.

Analysis of the test patterns may include a consideration of bar width ratios or comparison of bar widths observed to acceptable ranges. Primary analysis of the test information, however, will still be on the basis of actual significance as 1 to 0 data bits observed as the product of the actual, data-bit sensing functions of the system.

Changed clock times may be obtained by the conventional technique of interposing a programmable divider at the output of a highspeed oscillator. Clock outputs vary in effective frequency directly with the magnitude of the divisor.

Reading At The Selected Density

The reading operation need not be on a document prepared by the printer. The document to be read might be prepared by photographic techniques, in which case the bar code density could be very high. The basic limit in reading such high density would be by the effective aperture of the scanner 32.

As discussed in the foregoing referenced application Ser. No. 6/198,311, for reading, the operator manually steps the platen 22, by use of a platen forward key or control 63, to bring the carrier 33 above mark 5. The system is structured to respond to any vertical displacement reasonably close to mark 5. The dotted cross 65 in FIG. 1 indicates a point properly and sufficiently above mark 5.

The operator then manually operates the read bar code key 54. Further operation is automatic under control of alignment control 38 and the microprocessor 61. The first action is the centering of scanner 32 over mark 5. Control 38 directs movement of carrier drive 34 through carrier control 36 to a point spaced a predetermined carrier control 36 to a point spaced a predetermined amount from the left margin of paper 20 at which the nominal or approximate center of mark 5 will appear.

Alignment mark 5 is used as an accurate reference of the center of the data lines 3. Mark 5 is traversed and the distances observed are measured to locate the center of mark 5. The center of the first line of data 3 is then located on the basis of it being a predetermined number of increments of movement of platen 22 from mark 5. That is fully disclosed in the foregoing referenced application Ser. No. 6/198,311. Since it forms no part of this invention and this invention may be practiced with the bar code data located in other ways, including manual positioning by a machine operator, it will not be discussed further.

In the primary preferred form the first line of bar code contains preliminary document identifying and instructive information at the lowest density. This line is read with the time of clock 59 at that for the lowest density.

The density information is sensed and the clock time for subsequent reading is changed to be that for the density indicated.

As mentioned, the guard pattern or other data near the start of each line may be modified to define printing density. If such a system, the data at the start of each line is processed for the density information and the system timing is immediately changed accordingly.

Other modifications and variation may be apparent or developed in the future, but all within the spirit and scope of the invention with its modification and variations as described herein. Accordingly, patent protection is sought commersurate with the true scope of this invention.

I claim:

1. A method of recording information on a print-receiving medium in a bar code in which the distance between the edges of separated marks defines the meaning of said code comprising the steps of
   (1) printing a plurality of test patterns having groups of marks in said code of predetermined significance, each of said groups having edges of marks separated by different corresponding distances defining different densities of printed codes,
   (2) subsequently sensing said test patterns with a machine-controlled sensing apparatus and determining the apparent significance of said groups,
   (3) comparing said apparent significance of each said test pattern with the predetermined significance of that test pattern, and
   (4) printing subsequent data on said medium in said code with separation of marks at a distance between edges corresponding to the density of a said test pattern in which said apparent significance corresponds to its predetermined significance.

2. The method as in claim 1 in which prior to said printing in the said density selected a portion of data is printed in bar code in substantially the lowest density of said test patterns.

3. The method as in claims 1 or 2 in which said sensing apparatus is adapted to sense at regular intervals in response to clock signals and including the steps of changing said clock signals to different frequencies to accurately read data at the density of different ones of said test patterns, with said test patterns being read at said frequencies until the test pattern of the highest density is read which produces said apparent significance coresponding to its predetermined significance when read at a frequency to accurately read said test pattern of the highest density.

4. The method as in claim 1 in which said test patterns are separated by areas of predetermined content different from said bar code and the existence of said test pattern is recognized by said areas of predetermined content.

5. The method as in claim 1 in which said test patterns are at least three in number, each having marks defining different densities from the densities defined by the others.

6. A method of reading information recorded in a bar code in which the distance between the edges of separated marks defines the meaning of said code comprising the steps of
   (1) reading a predetermined part of said bar code with a machine-controlled sensing apparatus adapted to sense at a predetermined frequency of regular intervals, (2) comparing the results of said reading of said predetermined part against predetermined data defining density, and (3) setting the frequency of said intervals in accordance with the density defined by said comparing.

7. The method as in claim 1 in which said predetermined frequency is a frequency equal to or lower than said frequencies to which the intervals may be set.

8. A method of recording information on a print-receiving medium in a bar code in which the distance between the edges of separated marks defines the meaning of said code comprising the steps of (1) reading a predetermined part of said bar code with a machine-controlled sensing apparatus adapted to sense at a predetermined frequency of regular intervals, (2) comparing the results of said reading of said predetermined part against predetermined data information defining the correct data-content of said predetermined part, (3) printing subsequent data in said code at a density corresponding to said predetermined frequency when said comparing establishes that substantially correct data was read by said reading, and (4) printing subsequent data in said code at a lower density than said density corresponding to said predetermined frequency when said comparing does not establish that substantially correct data was read by said reading.

9. The method as in claim 8 in which said predetermined part is all of a line of bar code printed at one density.

10. A method as in claim 2 in which said test patterns are separated by areas of predetermined content different from said bar code and the existence of said test pattern is recognized by said areas of predetermined content.

11. The method as in claim 3 in which said test patterns are separated by areas of predetermined content different from said bar code and the existence of said test pattern is recognized by said areas of predetermined content.

12. The method as in claim 12 in which said test patterns are three in number, each having marks defining different densities from the densities defined by the others.

13. The method as in claim 3 in which said test patterns are at least three in number, each having marks defining different densities from the densities defined by the others.

14. The method as in claim 4 in which said test patterns are at least three in number, each having marks defining different densities from the densities defined by the others.

15. The method as in claim 10 in which said test patterns are at least three in number, each having marks defining different densities from the densities defined by the others.

16. The method as in claim 11 in which said test patterns are at least three in number, each having marks defining different densities from the densities defined by the others.

* * * * *

UNITED STATES PATENT AND TRADEMARK OFFICE
CERTIFICATE OF CORRECTION

PATENT NO. : 4,449,052
DATED : May 15, 1984
INVENTOR(S) : M. L. Krieg

It is certified that error appears in the above-identified patent and that said Letters Patent is hereby corrected as shown below:

At column 1, line 2, after "2." should be inserted --Background Art--

At column 10, line 14, "12" should be changed to "2".

Signed and Sealed this

Nineteenth Day of February 1985

[SEAL]

Attest:

DONALD J. QUIGG

Attesting Officer        Acting Commissioner of Patents and Trademarks